(12) United States Patent
Kato et al.

(10) Patent No.: US 11,280,652 B2
(45) Date of Patent: Mar. 22, 2022

(54) FLOW VELOCITY DISTRIBUTION MEASURING METHOD AND PARTICLE SIZE MEASURING METHOD

(71) Applicant: NATIONAL INSTITUTE OF ADVANCED INDUSTRIAL SCIENCE AND TECHNOLOGY, Tokyo (JP)

(72) Inventors: Haruhisa Kato, Tsukuba (JP); Yusuke Matsuura, Tsukuba (JP); Ayako Nakamura, Tsukuba (JP)

(73) Assignee: NATIONAL INSTITUTE OF ADVANCED INDUSTRIAL SCIENCE AND TECHNOLOGY

( * ) Notice: Subject to any disclaimer, the term of this patent is extended or adjusted under 35 U.S.C. 154(b) by 27 days.

(21) Appl. No.: 16/466,696

(22) PCT Filed: Dec. 5, 2017

(86) PCT No.: PCT/JP2017/043626
§ 371 (c)(1),
(2) Date: Jun. 5, 2019

(87) PCT Pub. No.: WO2018/105605
PCT Pub. Date: Jun. 14, 2018

(65) Prior Publication Data
US 2020/0064169 A1    Feb. 27, 2020

(30) Foreign Application Priority Data

Dec. 6, 2016  (JP) .............................. JP2016-236596
Apr. 5, 2017  (JP) .............................. JP2017-075193

(51) Int. Cl.
*G01F 1/708* (2006.01)
*G01F 1/7086* (2022.01)
(Continued)

(52) U.S. Cl.
CPC ....... *G01F 1/7086* (2013.01); *G01N 15/0227* (2013.01); *G01N 2015/0053* (2013.01)

(58) Field of Classification Search
CPC ........... G01F 1/7086; G01F 1/76; G01F 1/74; G01N 15/0227; G01N 15/0205; G01N 2015/0053; G01P 5/26; G01P 5/20
See application file for complete search history.

(56) References Cited

U.S. PATENT DOCUMENTS

2014/0333935 A1* 11/2014 Grier .................. G01B 9/02001
356/457
2018/0100793 A1*  4/2018 Ichiki ................. G01N 15/1429

FOREIGN PATENT DOCUMENTS

JP    2002-022642 A    1/2002
JP    2003-270261 A    9/2003
(Continued)

OTHER PUBLICATIONS

JP 2003270261—English (Year: 2003).*
(Continued)

*Primary Examiner* — Herbert K Roberts
*Assistant Examiner* — Fatemeh Esfandiari Nia
(74) *Attorney, Agent, or Firm* — Ostrolenk Faber LLP

(57) ABSTRACT

A measuring method enabling simple and accurate measurement of a flow velocity distribution in a flow field inside a flow passage of an optical cell and a particle size-measuring method using the measuring method are provided. Providing a tracer particle of a smaller size than wavelength λ of laser light into the flow passage and capturing a bright spot attributed to light scattering from tracer particles by camera, and obtaining the flow velocity distribution by the analysis unit by obtaining an amount of movement of each tracer particle from movement of the bright spot and correcting a Brownian motion component from a correlation between an (Continued)

average value of variations of the amount of movement and Brownian motion are performed.

5 Claims, 6 Drawing Sheets

(51) Int. Cl.
  *G01N 15/02* (2006.01)
  *G01N 15/00* (2006.01)

(56) References Cited

FOREIGN PATENT DOCUMENTS

| JP | 2003270261 A | * | 9/2003 |
|---|---|---|---|
| JP | 3867122 B2 | | 1/2007 |
| JP | 3919127 B2 | | 5/2007 |
| JP | WO 2016/159131 A1 | | 10/2016 |

OTHER PUBLICATIONS

J G Santiago, S T Wereley, C D Meinhart, D J Beebe, R J Adrian; Experiments in fluids 25 (4), 316-319 (Year: 1998).*
International Search Report dated Jan. 9, 2018 in corresponding PCT International Application No. PCT/JP2017/043626.
Written Opinion dated Jan. 9, 2018 in corresponding PCT International Application No. PCT/JP2017/043626.
J.G. Santiago et al., "A particle image velocimetry system for microfluidics," Experiments in fluids, 25(4), 316-319, 1998.
Fook Chiong Cheong, et al., "Holographic microrheology of polysaccharides from *Streptococcus mutans* biofilms" *Rheol Acta* (2009) 48:109-115.
John C. Crocker and David G. Grier, "Methods of Digital Video Microscopy for Colloidal Studies" *Journal of Colloid and Interface Science* 179, Article No. 0217 (1996) 298-310.
Fook Chiong Cheong, et al., "Flow visualization and flow cytometry with holographic video microscopy" *Optics Express* vol. 17, No. 15, (2009) 13071-13079.
David G. Grier, et al., "Soft Matter", *Royal Society of Chemistry*, vol. 11, No. 6, (Feb. 2015) 1062-1066.
Yusuke Matsuuara, et al., "Nanoparticle tracking velocimetry by observing light scattering from individual particles" *Sensors and Actuators B 256* (2018) 1078-1085.

* cited by examiner (a) FLOW VELOCITY CALCULATION BASED ON MESH DIVISION (b) FLOW VELOCITY CALCULATION BASED ON FUNCTION FITTING

FLOW VELOCITY DISTRIBUTION MEASURING METHOD AND PARTICLE SIZE MEASURING METHOD

CROSS-REFERENCE TO RELATED APPLICATIONS

The present application is a 35 U.S.C. §§ 371 national phase conversion of PCT/JP2017/043626, filed Dec. 5, 2017, which claims priority to Japanese Patent Application Nos. 2016-236596 and 2017-075193, filed Dec. 6, 2016 and Apr. 5, 2017, respectively, the contents of which are incorporated herein by reference. The PCT International Application was published in the Japanese language.

TECHNICAL FIELD

The present invention relates to a flow velocity distribution-measuring method enabling simple and accurate measurement of a flow velocity distribution in a flow field inside a flow passage of an optical cell and a particle size-measuring method using the flow velocity distribution-measuring method.

BACKGROUND ART

As in dynamic light scattering, in the case of on-line measurement of the particle size of particles flowing in a line, the flow affects the diffusion velocity of the particles. That is, the diffusion velocity of the particles is increased, and the apparent particle size is measured to be small. Therefore, the flow velocity is to be separately measured in consideration of the effect thereof. However, in a flow velocity-measuring devices currently available on the market, even in a case where the average flow rate of a high flow rate field or the whole system can be measured, a flow velocity distribution inside a flow passage of an optical cell cannot be measured.

Particle tracking velocimetry (PTV) and particle image velocimetry (PIV) have been suggested as a method of measuring the flow velocity distribution inside the flow passage of the optical cell. In these methods, the flow velocity distribution is obtained by sending tracer particles inside the flow passage measuring the displacement of each particle from a series of images obtained by capturing the particles at a certain time interval, and dividing the displacement by a capturing time interval. One advantage of these method is that temporal and spatial scales can be freely selected using a time interval and an observation region, and the scales can be introduced by either a macroscale or a microscale.

In the method of measuring the flow velocity distribution using the tracer particles, especially, in the case of the measuring the microscale flow velocity distribution using the submicron size of the trace particles, the effect of a random displacement caused by Brownian motion cannot be ignored.

NPL 1 suggests first, the displacement of the tracer particles in each region are calculated by PIV method after dividing a capturing region into lattices. Then, the flow velocity distribution are determined by smoothing the calculated velocity vector distribution by the time averaging of each vectors, assuming that Brownian motion is an unbiased random motion. In addition, PTL 1 suggests a method of smoothing Brownian motion using a local space average in order to improve a temporal resolution.

Particle tracking analysis (PTA) method is well known as the sizing method of Brownian nanoparticles. In PTA method, individual nanoparticles are visualized as bright spots resulting from the irradiation of each particles, and the Brownian motion of the bright spots is captured by image analysis.

PTL 2 discloses a particle size-measuring method in which a flow velocity component is removed from the motion of the light scattering bright spots in the PTA method. That is, in a case where the flow velocity component can be corrected by combining the above flow velocity distribution measurements, the particle size may be more accurately measured.

CITATION LIST

Patent Literature

[PTL 1] Japanese Unexamined Patent Application, First Publication No. 2003-270261
[PTL 2] PCT International Publication No. WO2016/159131 Pamphlet

Non-Patent Literature

[NPL 1] J G Santiago, S T Wereley, C D Meinhart, D J Beebe, R J Adrian; Experiments in fluids 25 (4), 316-319

SUMMARY OF INVENTION

Technical Problem

In order to the locally smooth the Brownian motion in PIV and PTV, it is necessary to obtain a sufficient number of ensembles on space average by increasing the number density (number concentration) of tracer particles. Therefore, one or more particles are set to enter a mesh that is divided in correspondence with a spatial resolution necessary for measuring the displacement vectors of the tracer particles for each capturing time. At this point, in a case where the interparticle distance is too short to ignore hydrodynamic interactions, the flow velocity cannot be accurately measured.

In addition, while it is originally desired to find the flow velocity distribution in the absence of the tracer particles, increasing the volume fraction of particles introduced the higher viscosity of the fluid and increasements a pressure loss, thereby affecting the flow velocity. For example, in the case of measuring the flow velocity at a constant pressure, the case of mixing the tracer particles results in a lower flow velocity value than the case of not mixing the tracer particles.

Furthermore, in a case where the particle size of the tracer particles is not sufficiently small compared to the representative width of the flow passage, and electrostatic repulsion interaction, van der Waals interaction, and hydrodynamic interaction between particles are not sufficiently weak to be ignorable, the flow field is distorted, and the flow velocity distribution is not accurately obtained.

Therefore, it is considered that the number density of particles is increased without decreasing the interparticle distance by decreasing the particle size. However, since the tracer particles are simply directly observed with an optical microscope observing reflective light caused from the particles by illuminated white light or their fluorescence in established PTV and PIV, the particle size cannot be decreased to or below submicron from the viewpoint of measurement sensitivity analysis.

The present invention is conceived in view of the above circumstance. An object of the present invention is to provide a measuring method enabling simple and accurate measurement of a flow velocity distribution in a flow field inside a flow passage of an optical cell and a particle size-measuring method for measurement target particles using the measuring method.

Solution to Problem

Flow velocity distribution measurement of the present invention is microscale PTV method observing tracer particles as bright spots visualized by irradiation of laser beam having higher power or shorter wavelength. Namely, the light scattering phenomena from individual particles can be enable to visualize the smaller particle size without direct observation of a tracer particles themselves. This method enable to detect the motion of the smaller tracer particles. Thus, for example, even in a case where the number density of the particle is increased, the occurrence of distortion of a flow field can be reduced resulted that a flow velocity distribution can be accurately measured. In addition, condensing the laser light, the observation sensitivity of the tracer particle and the measurement accuracy of the flow velocity distribution can be further improved by detecting a minute region obtained from narrowing a depth direction measurement range which is a measurement target for the flow velocity distribution.

In addition, a particle size-measuring method for the measurement target particle according to the present invention can use the same optical device for the above flow velocity distribution measurement. Furthermore, in the measurement of the particle size by capturing the measurement target particle, the effect of a light exposure time on the measured particle size is found, and more accurate particle size measurement may be performed by correcting the light exposure time.

That is, a flow velocity distribution-measuring device according to the present invention is a measuring device for a flow velocity distribution in a flow field inside a flow passage of an optical cell. In the device including a laser light irradiation unit irradiating laser light of a wavelength $\lambda$ into the flow passage, a camera capturing an inside of the flow passage to which the laser light is irradiated, and an analysis unit obtaining a flow velocity distribution in the flow field from at least a plurality of images captured in a light exposure time $\tau$ at each time interval $\Delta t$, providing a tracer particle of a smaller size than the wavelength $\lambda$ of the laser light into the flow passage and capturing a bright spot attributed to the light scattering from tracer particles by the camera, and obtaining the flow velocity distribution by the obtaining unit by obtaining an amount of movement of each tracer particle from movement of the bright spot and correcting a Brownian motion component from a correlation between an average value of variations of the amount of movement and Brownian motion are performed.

According to the invention, the tracer particle of small particle size can be observed based on light scattering phenomena from particles. Thus, the accurate flow velocity distribution measurement in the flow field inside the flow passage of the optical cell can be simply accomplished.

In the invention, the tracer particle and the measurement target particle may be the same and be captured in a single step. Furthermore, the tracer particle and the measurement target particle may have a particle size in a range of from 10 nm to 1 μm. According to the invention, the flow velocity distribution measurement and the particle size measurement can be performed at the same time.

In the invention, the average value may be an ensemble average or a time average. According to the invention, the accurate flow velocity distribution measurement in the flow field inside the flow passage of the optical cell can be simply accomplished.

In the invention, the laser light irradiation unit may radiate the laser light into the flow passage by narrowing a luminous flux, and the camera may capture the bright spot from the tracer particle inside the luminous flux. According to the invention, the range of the luminous flux can be selectively observed, and the accurate flow velocity distribution measurement in a specific part can be simply accomplished.

In the invention, the flow passage may be disposed at a gap between a pair of plate shaped bodies facing in a capturing axis direction of the camera in order to decrease a thickness with respect to a horizontal width. According to the invention, a decrease in the amount of information in the thickness direction of the optical cell in the capturing axis direction of the camera can be reduced, the accurate flow velocity distribution measurement can be simply accomplished.

In the invention, a particle size of the tracer particle may be from 10 nm to 1 μm.

In addition, the present invention is a particle size-measuring method for a measurement targeted Brownian particles in a flow field inside a flow passage of an optical cell. In a device including a laser light irradiation unit irradiating laser light of a wavelength $\lambda$ into the flow passage, a camera capturing an inside of the flow passage to which the laser light is irradiated, and an analysis unit obtaining a flow velocity distribution in the flow field from at least a plurality of images captured in a light exposure time $\tau$ at each time interval $\Delta t$ and obtaining particle size of the measurement target particle, the particle size-measuring method includes providing a tracer particle of a smaller size than the wavelength $\lambda$ of the laser light into the flow passage, capturing a bright spot attributed to the light scattering from tracer particles by the camera, and obtaining the flow velocity distribution in the analysis unit by obtaining an amount of movement of each tracer particle from movement of the bright spot and correcting a Brownian motion component from a correlation between an average value of variations of the amount of movement and Brownian motion, and providing measurement target particle into the flow passage, capturing the measurement target particle by the camera, and obtaining the particle size of the measurement target particle in the analysis unit by obtaining a corrected displacement obtained by removing a movement component of the flow field caused from the flow velocity distribution from a displacement of the measurement target particle.

According to the invention, the flow velocity distribution measurement in the flow field inside the flow passage of the optical cell can be simply and accurately performed, and the particle size of the measurement target particle having Brownian motion can be more accurately measured.

In the invention, d which is the particle size may be calculated from a relationship in which an average value of a square of the corrected displacement of the measurement target particle is proportional to $k_B t/3\pi\eta d$, where d is the particle size of the measurement target particle, $k_B$ is a Boltzmann constant, T is an absolute temperature, and $\eta$ is a viscosity coefficient in a dispersion medium of the flow field. Furthermore, a light exposure time for capturing the measurement target particle may be changed based on a measured particle size range of the measurement target particle. According to the invention, the particle size of the measurement targeted Brownian particles can be more accurately measured.

In the invention, the flow passage may be disposed at a gap between a pair of plate shaped bodies facing in a capturing axis direction of the camera in order to decrease a thickness with respect to a horizontal width. According to the invention, a decrease in the amount of information in the thickness direction of the optical cell in the capturing axis direction of the camera can be reduced, the accurate flow velocity distribution measurement can be simply accomplished.

In the invention, a particle size of the tracer particle may be from 10 nm to 1 μm.

In the invention, the analysis unit may obtain the amount of movement from movement of the bright spot and reduce a Brownian motion component from a correlation between an average value of variations of the amount of movement of each tracer particle and Brownian particle. In addition, the average value may be an ensemble average or a time average.

DESCRIPTION OF EMBODIMENTS

Hereinafter, first, a flow velocity distribution-measuring method as one example according to the present invention will be described using FIG. 1 to FIG. 4.

Figure 1:
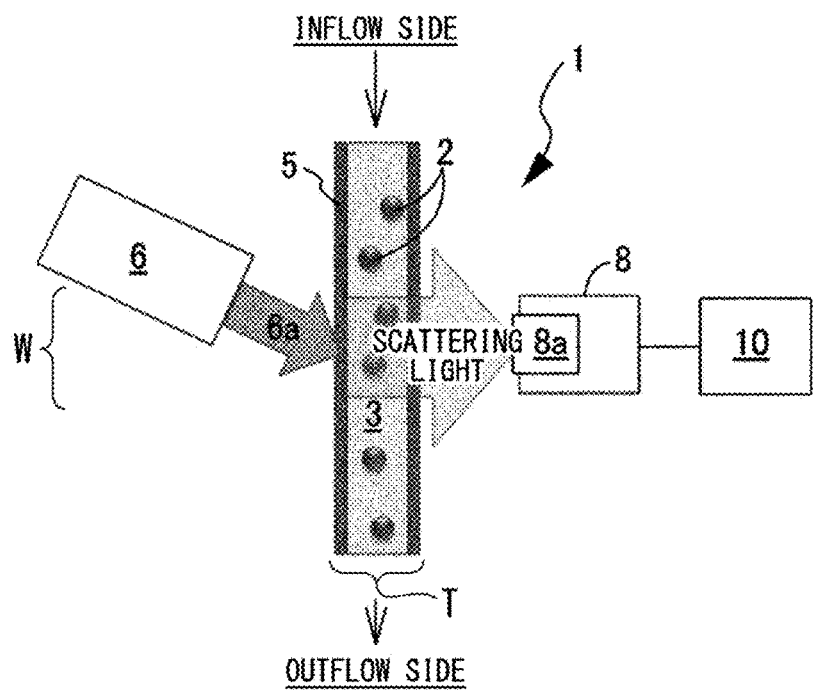
FIG. 1 is a configuration diagram illustrating a flow velocity distribution-measuring device according to the present invention.

As illustrated in FIG. 1, a measuring device 1 includes a transparent optical cell (column) 5 as a flow passage through which a dispersion medium 3 in which minute (tracer) particles 2 are dispersed pass, a laser light irradiation unit 6 capable of irradiating laser light 6a of a single wavelength λ to the particles 2 inside the optical cell 5, a capturing unit 8 including a camera 8a capturing the inside of the flow passage, and an analysis unit 10 calculating a flow velocity distribution of a flow field by analyzing an image obtained by the capturing unit 8.

The laser light irradiation unit 6 is arranged such that bright spots caused by scattering light from the particles 2 in the dispersion medium 3 are easily captured by the camera 8a. In the present example, the optical axis of the incident laser light 6a is inclined with respect to the longitudinal direction axis line of the optical cell 5. By controlling the inclination angle of the optical axis of the laser light 6a, observable depth can be adjusted to be increased independently of the depth of focus of the camera 8a. In order to obtain clear image in the camera 8a, it is preferable to increase the intensity of the scattering light using the laser light 6a at a short wavelength λ. As will be described below, the size of the particles 2 needs to be smaller than the wavelength λ of the laser light 6a.

The camera 8a of the capturing unit 8 is a microscope camera, a CCD camera, a CMOS, or the like and can consecutively capture the dispersion medium 3 flowing inside the optical cell 5 at a predetermined time interval Δt from a direction perpendicular to the longitudinal direction axis line of the optical cell 5. That is, the camera 8a is arranged to face the principal surface of the optical cell 5 and can capture the particles 2 inside the optical cell 5 as a motion picture. Each captured image is recorded as a motion picture having the predetermined time interval Δt as one frame.

In the invention, the flow passage may be disposed at a gap between a pair of plate shaped bodies facing in a capturing axis direction of the camera in order to decrease a thickness T with respect to a horizontal width W.

The analysis unit 10 is connected to the capturing unit 8 and performs image analysis and calculation on the captured image. By the image analysis and the calculation, the flow velocity distribution in the flow field inside the flow passage of the optical cell 5 is measured. Details will be described below.

Figure 2:
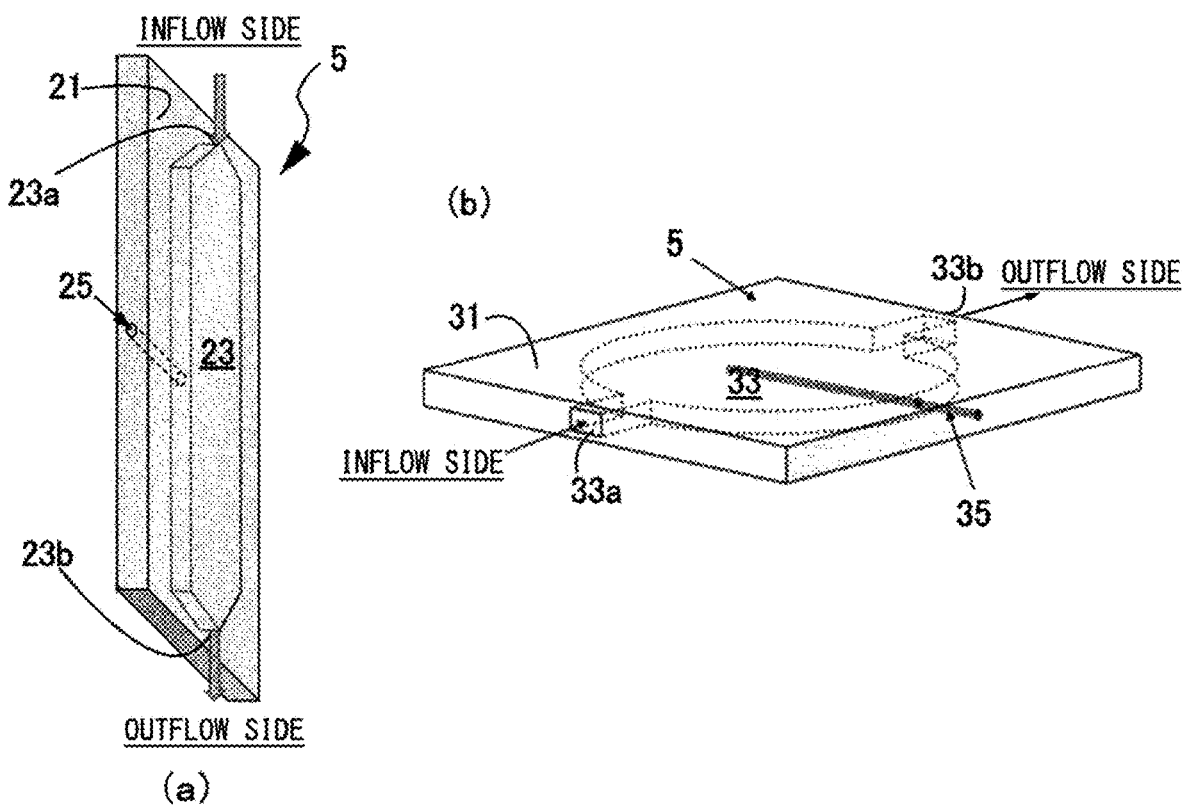
FIG. 2 is a perspective view illustrating an optical cell.

FIG. 2 illustrates several examples of the optical cell 5. As described above, for example, in the case of measuring the flow velocity distribution in the flow field using the optical cell 5 as an auxiliary device for a particle size-measuring device, the optical cell 5 complies with the specifications of the particle size-measuring device. In the method of the present invention, the form of the optical cell 5 is not significantly restricted. Thus, the flow velocity distribution in the flow field can be measured using the optical cell 5 as an auxiliary device for various measuring devices.

As illustrated in FIG. 2(a), for example, the optical cell 5 is created by punching (or by a cutting process) a hexagon in a metal plate to form a cell block 21 and sandwiching the cell block 21 between a pair of glass plates, not illustrated. Openings 23a and 23b on an inflow side and an outflow side of the dispersion medium 3 (refer to FIG. 1) are disposed in both end portions of a flow passage 23 of the cell block 21 having a hexagonal cylindrical shape. The optical cell 5 may also be used by disposing the principal surface of the cell block 21 horizontally. In addition, the laser light 25 may be directed to a side surface of the cell block 21.

In FIG. 2(b), as another example, for example, the optical cell 5 is created by punching (by a cutting process) a circle in a metal plate to form a cell block 31 and sandwiching the cell block 31 between a pair of glass plates, not illustrated. Openings 33a and 33b on the inflow side and the outflow side of the dispersion medium 3 (refer to FIG. 1) are disposed in both end portions of a flow passage 33 of the cell block 31 having a cylindrical shape. The optical cell 5 may be used by disposing the principal surface of the cell block 31 horizontally, and laser light 35 may be directed to a side surface of the cell block 31.

Figure 3:
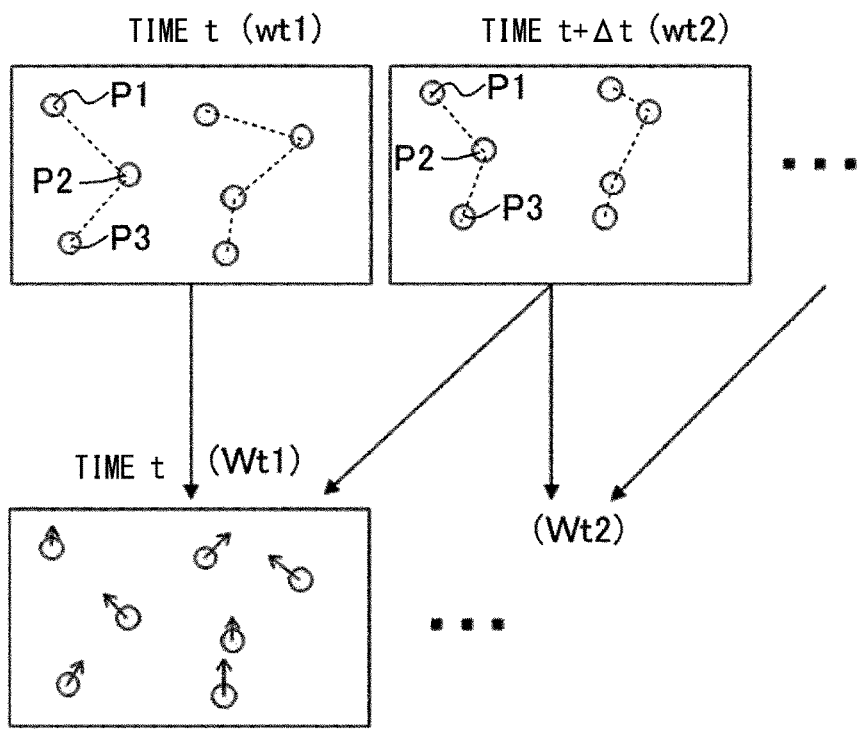
FIG. 3 is a diagram illustrating a principle of flow velocity distribution measurement.
Figure 4:
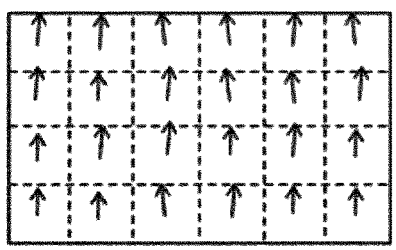
FIG. 4 is a diagram illustrating a method of flow velocity measurement.
Figure 4:
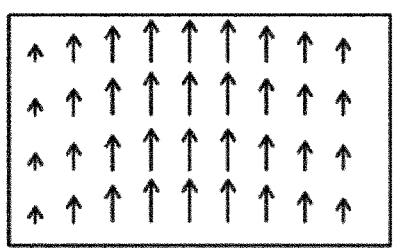

As illustrated in FIG. 3, particles having the most similar positional coordinates between images wt1 and wt2 captured at time t and time t+Δt are associated as the same particle. For example, the centroids of bright spots of three tracer particles of P1, P2, and P3 are obtained in each of the images wt1 and wt2 and associated. The associated particles are represented as having a displacement vector in a displacement vector image Wt1 at time t. Similarly, the same particles between images wt2 and wt3 captured at time t+Δt and time t+2Δt are associated, and an image Wt2 is obtained. This process is repeated.

Next, the flow velocity distribution is obtained by reducing components having Brownian motion. To do so, a well-known method may be used. For example, isotropic random elements may be reduced using a method of dividing the images Wt1 ... Wtn into meshes and calculating the ensemble average of displacement vectors in each mesh as illustrated in FIG. 4(a) or a method of performing function fitting on the displacement vectors as illustrated in FIG. 4(b).

According to the above method, even in the case of deciding the flow velocity distribution at a spatial resolution of micrometer as an observation limit, tracer particles having a size of less than or equal to submicron, which is a size less than 1/10 of micrometer, can be used. For example, in a case where one tracer particle is arranged in the mesh of micrometer, the volume fraction of the tracer particle is 1/1000. Thus, the effect of the tracer particle on the flow field is small, and the number of ensembles can be increased. In addition, in the case of application to a minute particle dispersion system such as the particle size-measuring device, it is not necessary to mix the tracer particles, and the tracer particles can be included in the actual measurement itself.

The uncertainty of the flow velocity distribution measured using a capturing time can be corrected by predicting the magnitude of Brownian motion before the measurement and obtaining the average number of particles in the image. In addition, in a case where the function forms of laminar flow and the flow velocity distribution are known, the number of ensembles for deciding the flow velocity can be increased, and the flow velocity can be decided in a short time measurement. This can be applied to an abnormal flow. In addition, by combining the flow velocity distribution measurement based on mesh division with a 2-dimensional smoothing spline process, abnormal flow velocity distribution measurement can be performed without predicting the function form of fitting.

Next, a method of measuring the particle size of the measurement target particles using the flow velocity distribution will be described based on the above flow velocity distribution-measuring method. The measurement target particles are the same as the tracer particles. For example, the particle size range of the measurement target particles may be from 10 nm to 1 μm. This is preferable because the particle size can be accurately measured in a single capturing step.

Particle size measurement based on the PTA method is well-known and thus, will not be repeated. In a case where the bright spots in the flow field are captured using the PTA method, the bright spots are captured with blurs in the flow direction depending on a light exposure time. That is, in a case where the flow velocity is increased and/or the light exposure time is increased, uncertainty in the decision of the coordinate positions of the bright spots from capturing data is increased. In a case where the uncertainty of the coordinate positions is denoted by ε, the light exposure time is denoted by τ, a capturing interval is denoted by Δt, the particle size is denoted by d, the Boltzmann constant is denoted by $k_B$, the absolute temperature is denoted by T, and a viscosity coefficient of the flow field in the dispersion medium is denoted by η, an average value MSD of the square of the distance of the displacement is represented as follows.

$$MSD = \frac{4k_B T}{3\pi\eta d}\left(\Delta t - \frac{\tau}{3}\right) + 2\varepsilon^2 \quad \text{[Expression 1]}$$

The effect of movement of ε caused by the flow velocity is proportional to the product of a flow velocity v and the light exposure time and may be as follows.

$$\varepsilon \propto V\tau \quad \text{[Expression 2]}$$

That is, it is preferable to correct ε in the particle size measurement in the flow field.

Therefore, in order to accurately measure the particle size, MSD is corrected by removing $K_2 v^2 \tau^2$ corresponding to the term $2\varepsilon^2$ from the above expression of MSD. The measurement value of the particle size may be decided using the PTA method based on corrected MSD. For example, the parameter $K_2$ can be obtained from the measurement result of the particle size. An example of actually obtaining $K_2$ will be described below.

EXAMPLE

An example of observing scattering light from the particles 2 as bright spots using an optical microscope and measuring the flow velocity distribution in the measuring device 1 in FIG. 1 will be described. Polystyrene latex particles having a diameter of approximately 100 nm are used as the particles 2. Water is used as the dispersion medium 3.

Figure 5:
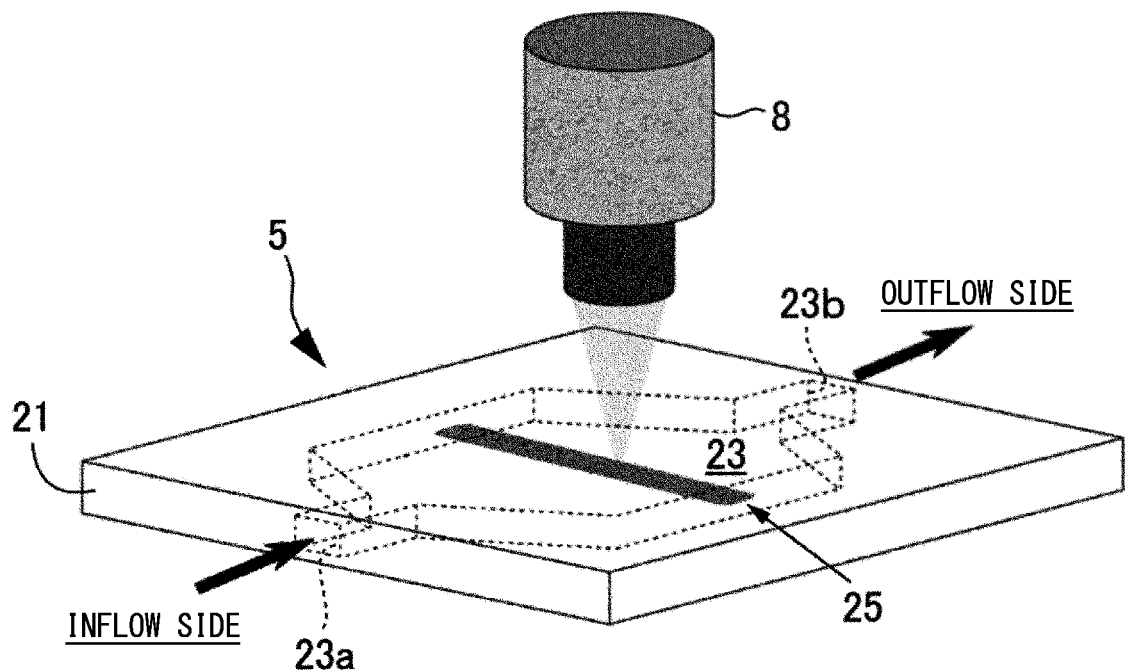
FIG. 5 is a perspective view illustrating an example of the flow velocity distribution measurement.

As illustrated in FIG. 5, the laser light 25 is directed to the side surface of the optical cell 5 in which the flow passage 23 having a hexagonal cylindrical shape is formed in the cell block 21. The bright spots caused by scattering light from the particles 2 dispersed in the dispersion medium 3 flowing inside the optical cell 5 are captured by the capturing unit 8. The dispersion medium 3 is directed to the flow passage 23 having a width of 16 mm and a thickness of 1 mm from the opening 23a on the inflow side and is emitted from the opening 23b on the outflow side. As a verification experiment, the flow velocity of the dispersion medium 3 is controlled to be 110 μm/s inside the flow passage 23 by a syringe pump. In addition, the laser light 25 is semiconductor laser light having a wavelength of 640 nm. The laser light 25 is incident parallel to the bottom surface of the flow passage 23 and causes light scattering on the particles 2 in the dispersion medium 3.

The capturing unit 8 includes the optical microscope arranged to have an optical axis perpendicular to the optical axis of the laser light 25 and a CDD camera capturing the bright spots caused by sidewise scattering from the particles 2 through the optical microscope. The optical microscope includes a 20× objective lens. Accordingly, a range of 110 μm×83 μm×20 μm can be enlarged and observed. Scattering light obtained from the particles 2 is captured by the CCD camera at a shutter speed of 30 msec and a frame rate of 30 fps.

The particle size of the particles 2 is smaller than the wavelength λ of the laser light. Thus, the particles 2 are microscopically observed as bright spots having approximately the same size as the wavelength regardless of the shape and size of the mixed particles. The position of the centroid of the bright spot is set as the positional coordinates of the particle.

Figure 6:
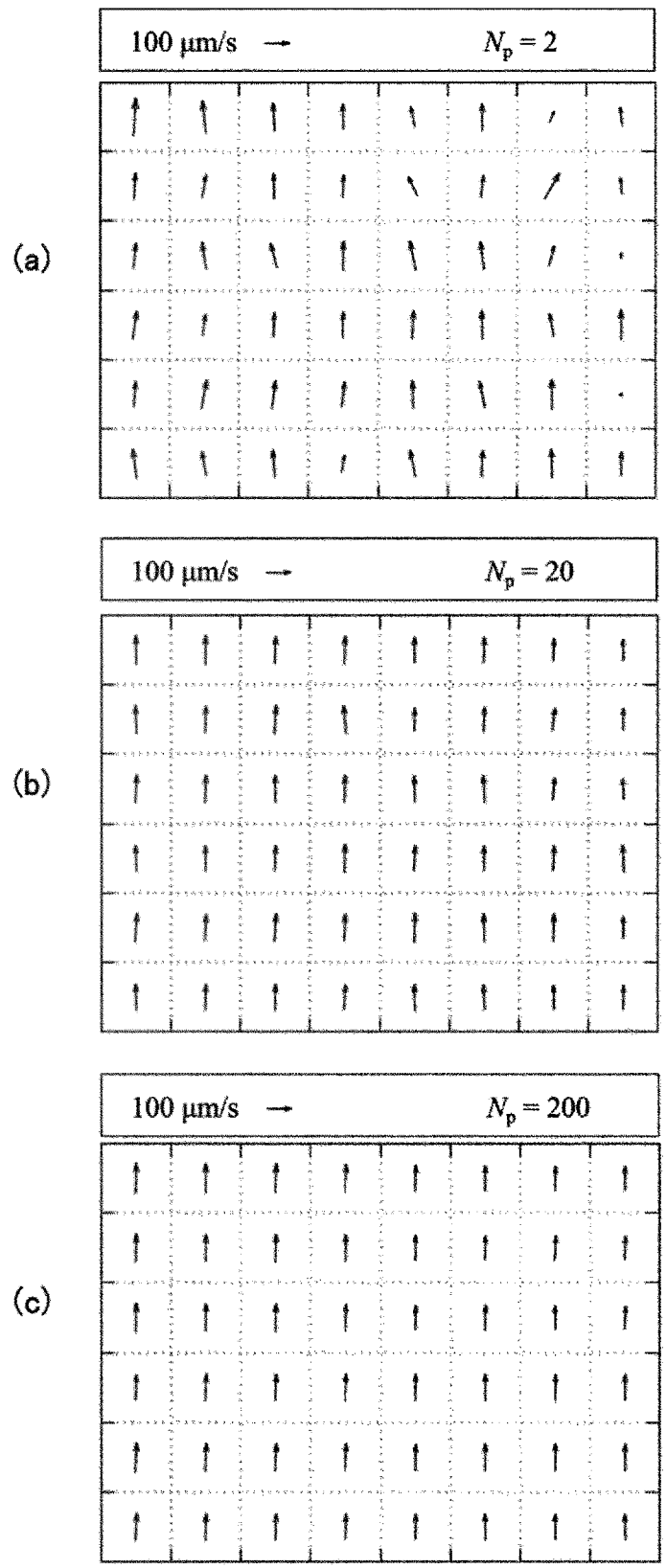
FIG. 6 is a result of the flow velocity distribution measurement based on mesh division.

FIG. 6 illustrates the measurement result of the flow velocity distribution based on the mesh division method (refer to FIG. 4(a)). The bright spots caused by the particles 2 are captured at a frame rate of 30 fps. A flow velocity vector is calculated by calculating the average of the displacement vectors of 2 bright spots, 20 bright spots, and 200 bright spots in each square region obtained by dividing the captured image into meshes of 14 μm×14 μm. The flow velocity vector is illustrated in FIGS. 6(a), 6(b), and 6(c). It can be observed that by increasing a number $N_p$ of displacement vectors, the flow velocity distribution is correctly reflected. In addition, the measured average flow velocity is 110 μm/s, and a correct flow velocity value is reflected.

The magnitude of Brownian motion can be formulated as the self-diffusion coefficient of each particle. In the displacement caused by Brownian motion at time Δt, x, y, and z components act independently. Thus, each component is known to act as a normal distribution having an average of 0 and a variance of 2DΔt. A self-diffusion coefficient D is represented by the following relational expression of Stokes-Einstein.

$$D = \frac{k_B T}{3\pi\eta d}$$ [Expression 3]

$k_B$: Boltzmann Constant η: Viscosity of Specimen
T: Absolute Temperature d: Particle Size (Diameter of Particle)
π: Ratio of Circumference to Diameter of Circle The decision accuracy of the positional coordinates is assumed to be approximately equal to the spatial resolution in the optical observation and thus, is approximately equal to the laser wavelength λ. In addition, this component acts independently of Brownian motion.

Consequently, statistical properties of the displacement in the elapsed time Δt are derived. In a case where an i component of the velocity is denoted by $v_i$, an i component $r_i$ (i=x, y) of the displacement at Δt complies with a normal distribution having an average of $v_i\Delta t$ and a variance of $2D\Delta t+(m\lambda)^2$. Here, m is a constant related to the positional decision of brightness and is approximately 0.1. Thus, in a case where the ensemble average and least squares fitting are calculated using a number n of pieces of data, the variance of an estimation value is decreased by 1/n. Thus, an estimated standard deviation (uncertainty) of the velocity is obtained by the following relational expression.

$$\sigma_v = \frac{1}{\Delta t}\sqrt{\frac{2D\Delta t+(m\lambda)^2}{n}}$$ [Expression 4]

Therefore, in a case where the estimated standard deviation (uncertainty) of the flow velocity is obtained from the result in FIG. 6(c) using a representative value of a self-diffusion coefficient of 4.8 μm²/s of the particles obtained when the measurement temperature is 25 degrees Celsius, the particle size is 100 nm, and the dispersion medium is water, the estimated standard deviation is 2 μm/s. In addition, the standard deviation of one displacement is 0.8 μm and approximately matches a standard deviation of 0.8 μm caused by Brownian motion.

Figure 7:
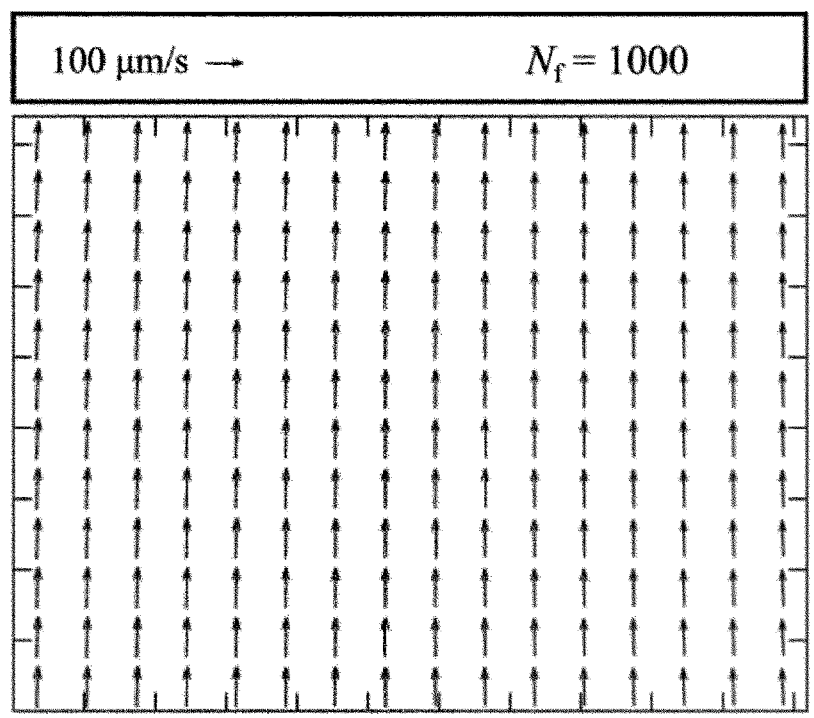
FIG. 7 is a result of the flow velocity distribution measurement based on function fitting.

FIG. 7 illustrates the measurement result of the flow velocity distribution based on the function fitting method (refer to FIG. 4(b)). The bright spots caused by the particles 2 are captured at 30 fps, and the flow velocity distribution is fitted using a linear position function. A number $N_f$ of displacement vectors related to the fitting is 1000. The measured average flow velocity is 105 μm/s, and the uncertainty is 2 μm/s.

Figure 8:
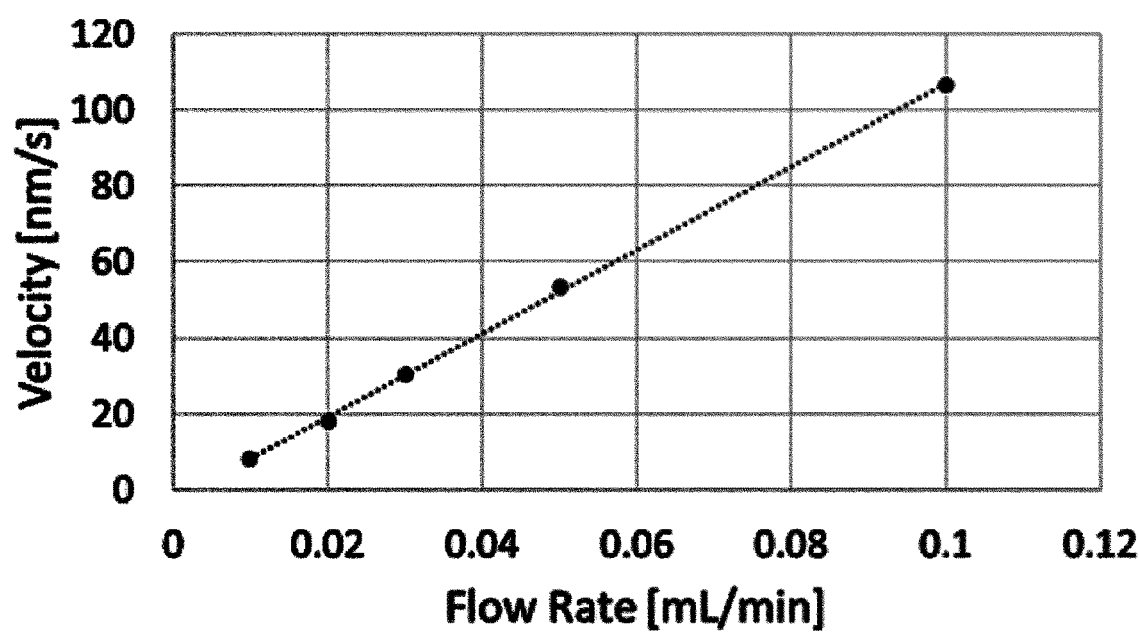
FIG. 8 is a graph showing a correspondence between a flow rate and a flow velocity.

FIG. 8 is the result of performing the capturing at 30 fps for 30 seconds by changing the flow rate in the same region inside the optical cell 5 and calculating the ensemble average of all displacements in the mesh division method (refer to FIG. 4(a)). As will be understood below, linearity between the flow rate and the flow velocity is obtained, and the linearity means that an accurate flow velocity can be measured.

Next, an example of obtaining the parameter $K_2$ used for correcting MSD will be described.

The above particle size measurement is performed at a flow velocity of 50 μm/s or below using a solution in which polystyrene latex having a size of 92.4 nm (nominal) is dispersed in water. In the particle size measurement, the inside of the flow passage is captured at a frame rate of 30 fps and a light exposure time of 6 ms and 30 ms.

Figure 9:
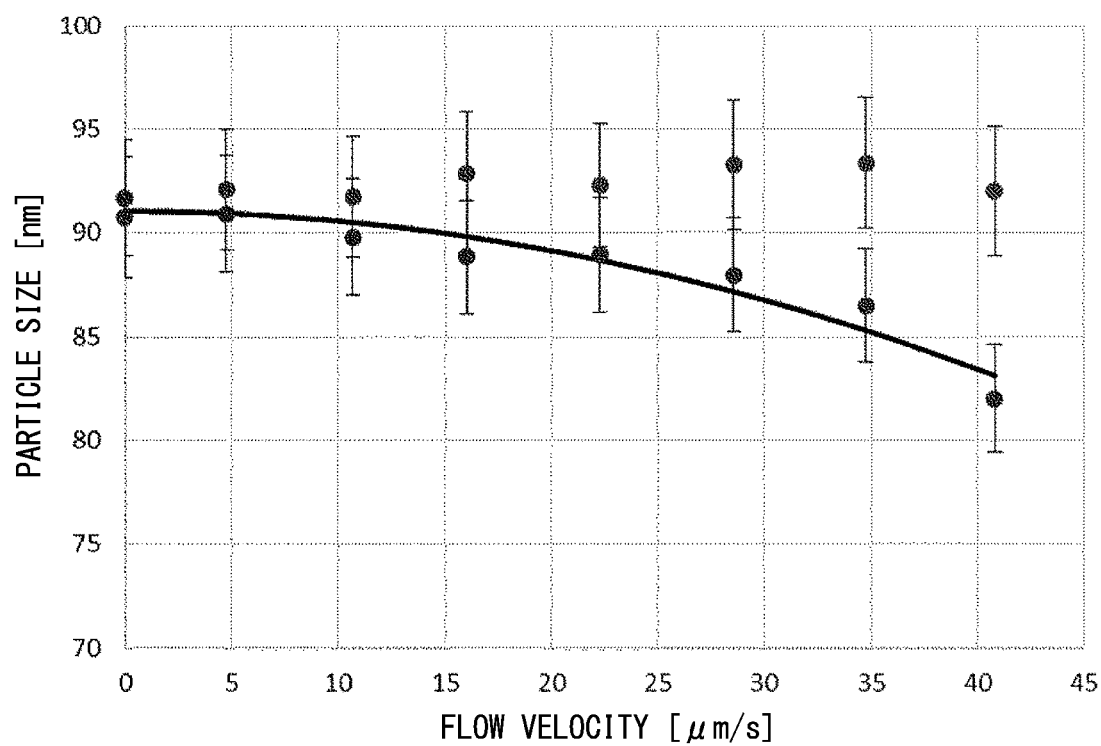
FIG. 9 is a graph showing a relationship between the flow velocity and a measured particle size in a case where a light exposure time is changed.

As illustrated in FIG. 9, in a case where the light exposure time is 30 ms, the measured particle size tends to be decreased along with an increase in flow velocity. Therefore, such a case is dealt with by fitting a curve to the measured particle size using a quadratic function of the flow velocity. In a case where the parameter $K_2$ is obtained from the curve, 0.03 is obtained. That is, it is understood that the uncertainty of the coordinate position of the bright spots in the capturing data is approximately 10% of the displacement of the bright spots moving in the light exposure time due to a flow.

In a case where the light exposure time is set to 6 ms, the measured particle size does not have a significant change with respect to a change in flow velocity. In a case where the light exposure time is set to 6 ms, the effect of blur occurring in the flow direction is theoretically reduced by 1/25 of that in a case where the light exposure time is set to 30 ms, and this result is valid.

While a representative example according to the present invention and a modification example based on the example have been described thus far, the present invention is not necessarily limited to the example and the modification example. Those skilled in the art will find various substitute examples without departing from the scope of the appended claims.

REFERENCE SIGNS LIST

1: MEASURING DEVICE
2: MINUTE (TRACER) PARTICLE
3: DISPERSION MEDIUM
5: OPTICAL CELL (COLUMN)
6: LASER LIGHT IRRADIATION UNIT
8: CAPTURING UNIT
8a: CAMERA
10: ANALYSIS UNIT
21, 31: CELL BLOCK

The invention claimed is:

1. A particle size-measuring method for a measurement targeted Brownian particles in a flow field inside a flow passage of an optical cell, comprising:
in a device including a laser light irradiation unit irradiating laser light at a wavelength λ into the flow passage, a camera capturing an inside of the flow passage to which the laser light is irradiated, and an analysis unit obtaining a flow velocity distribution in the flow field from at least a plurality of images captured in a light exposure time τ at each time interval Δt and obtaining particle size of the measurement target particle, providing a tracer particle of a smaller size than the wavelength λ of the laser light into the flow passage, capturing a bright spot attributed to the light scattering from tracer particles by the camera, and obtaining the flow velocity distribution in the analysis unit by obtaining an amount of movement of each tracer particle from movement of the bright spot and correcting a Brownian motion component from a correlation between an average value of variations of the amount of movement and Brownian motion; and providing the measurement target particle into the flow passage, capturing the measurement target particle by the camera, and obtaining the particle size of the measurement target particle in the analysis unit by correcting an average value MSD of a square of distance of displacement of the measurement target particle using the square of the flow velocity, wherein a particle size of the tracer particle is from 10 nm to 100 nm.

2. The particle size-measuring method according to claim 1,
wherein the tracer particle and the measurement target particle are the same and are captured in a single step.

3. The particle size-measuring method according to claim 1,
wherein the particle size is calculated from a relationship in which an average value of a square of the corrected displacement of the measurement target particle is proportional to $k_B t/3\pi\eta d$, where d is the particle size of the measurement target particle, $k_B$ is a Boltzmann constant, T is an absolute temperature, and η is a viscosity coefficient in a dispersion medium of the flow field.

4. The particle size-measuring method according to claim 3,
wherein a light exposure time for capturing the measurement target particle is changed based on a measured particle size range of the measurement target particle.

5. The particle size-measuring method according to claim 1, wherein $$MSD = \frac{4k_B T}{3\pi\eta d}\left(\Delta t - \frac{\tau}{3}\right) + 2\varepsilon^2$$

ε represents uncertainty of coordinate positions,
τ represents light exposure time,
Δt represents capturing interval,
d represents particle size,
$k_B$ is Boltzmann's constant,
T is absolute temperature, and
η represents a viscosity coefficient of the flow field in the dispersion medium, and wherein MSD is corrected by removing $K_2 v^2 \tau^2$, which corresponds to $2\varepsilon^2$.

* * * * *